United States Patent [19]
Brodie et al.

[11] Patent Number: 5,724,916
[45] Date of Patent: Mar. 10, 1998

[54] SYNTHETIC HORSE BEDDING

[76] Inventors: Scott Brodie; Dean Corke, both of 66 Dudley St., Coogee NSW 2034, Australia

[21] Appl. No.: 374,640
[22] PCT Filed: Jul. 22, 1993
[86] PCT No.: PCT/AU93/00370
    § 371 Date: Jan. 20, 1995
    § 102(e) Date: Jan. 20, 1995
[87] PCT Pub. No.: WO94/02003
    PCT Pub. Date: Feb. 3, 1994

[30] Foreign Application Priority Data

Jul. 22, 1992 [AU] Australia ................. PL3651

[51] Int. Cl.⁶ ........................... A01K 1/015
[52] U.S. Cl. ........................... 119/525
[58] Field of Search ............... 119/502, 503, 119/509, 516, 525, 526, 527, 528, 529, 530; 52/302.4; 5/724, 699, 740, 656, 420

[56] References Cited

U.S. PATENT DOCUMENTS

| | | | |
|---|---|---|---|
| 3,209,380 | 10/1965 | Watsky | 5/724 |
| 4,129,097 | 12/1978 | Schwartzkopff et al. | 119/28 |
| 4,502,415 | 3/1985 | Schwarzkopff et al. | 119/28 |
| 4,673,452 | 6/1987 | Awdhan | 5/740 X |
| 5,463,785 | 11/1995 | McKeel | 5/724 X |

FOREIGN PATENT DOCUMENTS

| | | | |
|---|---|---|---|
| 67 391/81 | 11/1981 | Australia . | |
| 435-050-A | 7/1991 | European Pat. Off. . | |
| 2 368 885 | 5/1978 | France . | |
| 2666195-A | 3/1992 | France . | |
| 131264 | 6/1978 | Germany | 119/525 |
| 2930750 | 2/1981 | Germany | 5/724 |
| 2198940 | 6/1988 | Germany | 5/724 |
| 3841-993-A | 6/1990 | Germany . | |
| 8900-860-A | 4/1989 | Netherlands . | |
| 87-354055/50 | 5/1987 | U.S.S.R. . | |

*Primary Examiner*—Thomas Price
*Attorney, Agent, or Firm*—Claude A. S. Hamrick

[57] ABSTRACT

A floor/wall matting suitable for but not limited to animal stables, stalls, floats, etc. The floor/wall matting comprises a compressible support layer covered with an upper cover layer of puncture resistant moisture impervious material. The matting is formed with a plurality of apertures sized to allow passage of animal waste or debris from the upper surface of the matting to a plurality of drainage channels extending along an underside of the matting. The matting provides excellent physical and thermal insulation and hygienic conditions. The inventive floor/wall matting may be used in conjunction with a flushing system positioned adjacent the drainage channels to flush waste and debris which has passed through the apertures of the matting out of the drainage channels to a septic or sewerage outlet.

22 Claims, 6 Drawing Sheets

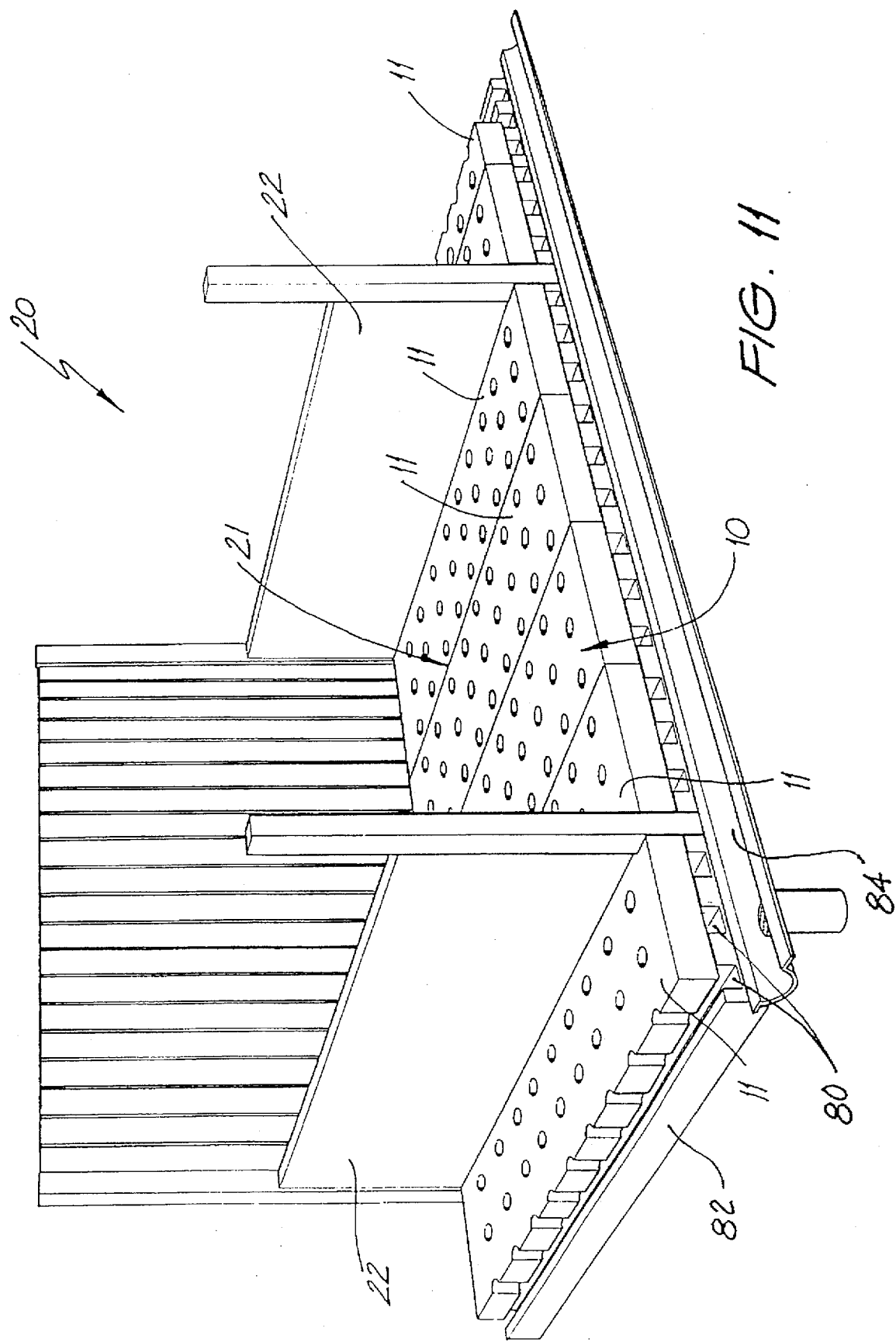

5,724,916

SYNTHETIC HORSE BEDDING

TECHNICAL FIELD

The present invention relates to floor/wall coverings which are suitable for, but not limited to, use with animals, particularly for stalls, stables, boxes, pens or floats in which animals are housed or transported.

BACKGROUND ART

Most stables, stalls, boxes, pens or floats, etc, for animal stock, eg, horses, pigs, cattle, are covered with straw or similar particulate bedding material in order to insulate the stock from the hard and usually cold floor and to absorb waste and debris from the animals.

To ensure cleanliness and prevent the spread of disease in this conventional bedding material, replacement material must continually be provided and the used material cleaned out of the stables or stall and disposed. Not only is the purchase and transportation of conventional straw or other particulate bedding expensive, particularly in remote and areas, but the disposal of large quantities of used bedding which is soaked with animal waste is also costly.

Further, conventional particulate bedding of straw, wood shavings, sawdust, etc, is inadequate in terms of protection and insulation from the stable floor and walls. Once the conventional bedding has been placed in the stall, it is usually scattered by the animal leaving areas of the floor exposed. In addition, straw or other particulate bedding tends to cause the animal to slip and possibly fall when trying to move about the stall or stable. This is particularly true for horses when trying to stand up. The conventional bedding of straw, wood shavings or sawdust bedding slides over the stable floor, especially if it is wet. When the horse tries to stand, it tends to get the bedding under its hooves, thereby slipping and possibly injuring itself.

In an attempt to combat these problems with conventional bedding of straw, sawdust, wood shavings, etc, it has previously been proposed to provide a replacement bedding in the form of a matting either laid down in sections or cut to the exact size of the stall or stable.

For example, U.S. Pat. Nos. 4,129,097 and 4,502,415 disclose a stable floor for animals comprising a compressible sub layer of porous filamentary material embedded in a top moisture impervious layer.

While this matting provides a reasonable thermal insulation from the stable floor, there is no mechanism for removing animal waste or debris from the stable. The matting of U.S. Pat. Nos. 4,129,097 and 4,502,415 requires that all animal waste and debris, dirt, etc, be manually picked up from the matting and taken away. Alternatively, the mat itself may be entirely removed from the stable and washed down.

In addition, any animal waste or material which finds its way under the upper layer of the matting disclosed in U.S. Pat. Nos. 4,129,097 and 4,502,415 will be absorbed and retained by the porous filamentary compressible sub-layer. This absorption of animal waste leads to unacceptable conditions for both the animal and stable hand. Not only would the smell quickly become intolerable, but the entrapment of animal waste under the matting will undoubtedly cause the spread of disease.

In response to these difficulties, German patent specification No 2649054 has suggested using moisture impermeable closed cell foam with a plurality of apertures to allow animal waste and debris to pass therethrough. However, this matting suffers from similar problems as outlined above, since it does not provide any mechanism for removal of the material that passes through the aforesaid apertures.

In addition, these prior art mats are quite thin, eg, 10–40 mm thick. Such a thickness is insufficient to provide both physical and thermal insulation for the animal from the stable floor and walls. To overcome these difficulties, the mats of U.S. Pat. Nos. 4,129,097 and 4,502,415 and German patent specification No 2649054 are used in conjunction with conventional bedding material, eg, straw, wood shavings, sawdust, etc, which leads to all the previously discussed difficulties of conventional bedding supply and disposal.

In order to ameliorate the disadvantages of the prior art, it is proposed to provide a floor/wall covering which offers a choice over the prior art and which, at least in the preferred embodiments, provides sufficient physical and thermal insulation for the animal without the need for additional conventional bedding, while allowing efficient removal of animal waste/debris.

According, in a first aspect, the present invention provides a floor/wall matting comprising a compressible support layer with an upper cover layer of moisture impervious puncture resistant material, said matting having a plurality of apertures therethrough sized to at least allow passage of animal fluid waste from the upper cover layer of said matting to a plurality of drainage channels extending along an underside of said matting, said drainage channels formed on the underside of the support layer or formed in the wall or floor covered by the matting when in situ.

In one embodiment, the support layer is constructed from a substantially moisture impermeable closed cell foam. Particularly preferable closed cell foams include ethylene vinyl acetate, ethylene-propylene-diene monomer (E.P.D.M.), styrene-butadiene-rubber (S.D.R.), polyisoprene, polychloroprene or polyethylene.

In yet another embodiment, the upper cover layer is constructed from a puncture resistant rubber layer and is preferably between 1 and 10 millimeters thick. The thickness of the support layer will be altered according to usage, however, it is preferred that this support layer be between 30 and 80 millimeters thick in order to provide adequate physical and thermal insulation.

In a second aspect, the present invention provides a floor/wall covering and cleaning assembly comprising the abovementioned floor/wall matting and a flushing system adjacent the drainage channels of said floor/wall matting to flush waste or debris which passes through the apertures of said floor/wall matting, out of said drainage channels.

In a first embodiment of the second aspect of the present invention the flushing system comprises a conduit extending along an end edge of said floor/wall matting with a plurality of apertures in said conduit aligned with said drainage channels to force a flushing liquid along said channels.

It is envisaged that these drainage channels may be flushed by any appropriate liquid including water, disinfectant or bacteriocide.

In order to assist in flushing of the animal waste or debris from the drainage channels it is preferred that the conduit of the flushing system extends along an upper portion of the floor/wall covered by the inventive matting in order to force a flushing liquid along said drainage channels to the lower portions of the floor or wall below said upper portions.

The matting and covering/cleaning assembly of the second aspect can completely replace conventional particulate bedding used in animal stalls or stables. The matting of the invention therefore eliminates the need to transport and remove conventional particulate bedding. This of course substantially reduces the amount of labour involved in stable maintenance and cleaning.

The matting of the invention can be made dust free, shock absorbent and hygienically superior to any other conventional form of particulate bedding. In addition, the matting does not spread about as does conventional particulate bedding and ensures that all areas on which the matting is laid are adequately covered. The non-slip surface of the upper cover layer also assists in animals standing up and moving about in the stable since, unlike conventional particulate bedding, it does not move relative to the stable floor.

Any animal waste or debris such as stones, dirt, etc. may be hosed through the apertures in the inventive matting down into drainage channels where it flows down towards the sewage outlet. This removal of the animal waste or debris from the drainage channels is assisted by the flushing system which forces a flushing liquid along the drainage channels.

Apart from the thermal and physical insulation that the inventive matting provides, because of the immediate removal of animal waste, debris and the non-absorbent nature of the matting, the present invention provides a more hygienic environment than conventional particulate bedding. This hygienic environment ensures that cuts or abrasions on the animals have less chance of becoming infected.

In addition, unlike previous replacement matting the present invention does not allow urine or other animal waste to build up under the mat. Unlike the present invention, urine and other animal waste, will find its way under conventional matting where it ferments increasing the temperature on the underside of the conventional matting leading to possible spontaneous combustion. In addition, this build up of urine and other animal waste encourages maggots to breed under the conventional matting.

By providing apertures through the matting of the invention which leads to drainage channels underneath the matting all urine and other animal waste may pass through the matting and along the drainage channels to a suitable sewerage outlet. The force of the animal walking about the matting acts to circulate air throughout the underside of the matting thereby preventing fermentation of the animal waste. In addition, the second aspect of the present invention allows regular flushing of the animal waste from the underside of the matting ensuring no build up of this waste or consequent breeding of maggots.

The inventive matting is also light weight and easy to handle and transport. It may be cut to size or alternatively provided in prefabricated sections.

While the inventive matting is particularly suitable for storage and transport of livestock, it may also be used in for example children's playgrounds where it also acts to physically insulate children from the surrounding environment while ensuring hygienic conditions.

BRIEF DESCRIPTION OF THE DRAWINGS

The present invention will now be described by way of example only with reference to the accompanying drawings in which:

FIG. 11 is a perspective view of a floor/wall matting assembly in accordance with a further embodiment of the present invention.

MODE(S) FOR CARRYING OUT THE INVENTION

The present invention comprises a floor/wall matting 10 especially suited for, but not limited to, covering the floor or walls of a stable, stall, pen, box or float in which an animal may be stored or transported.

Figure 1:
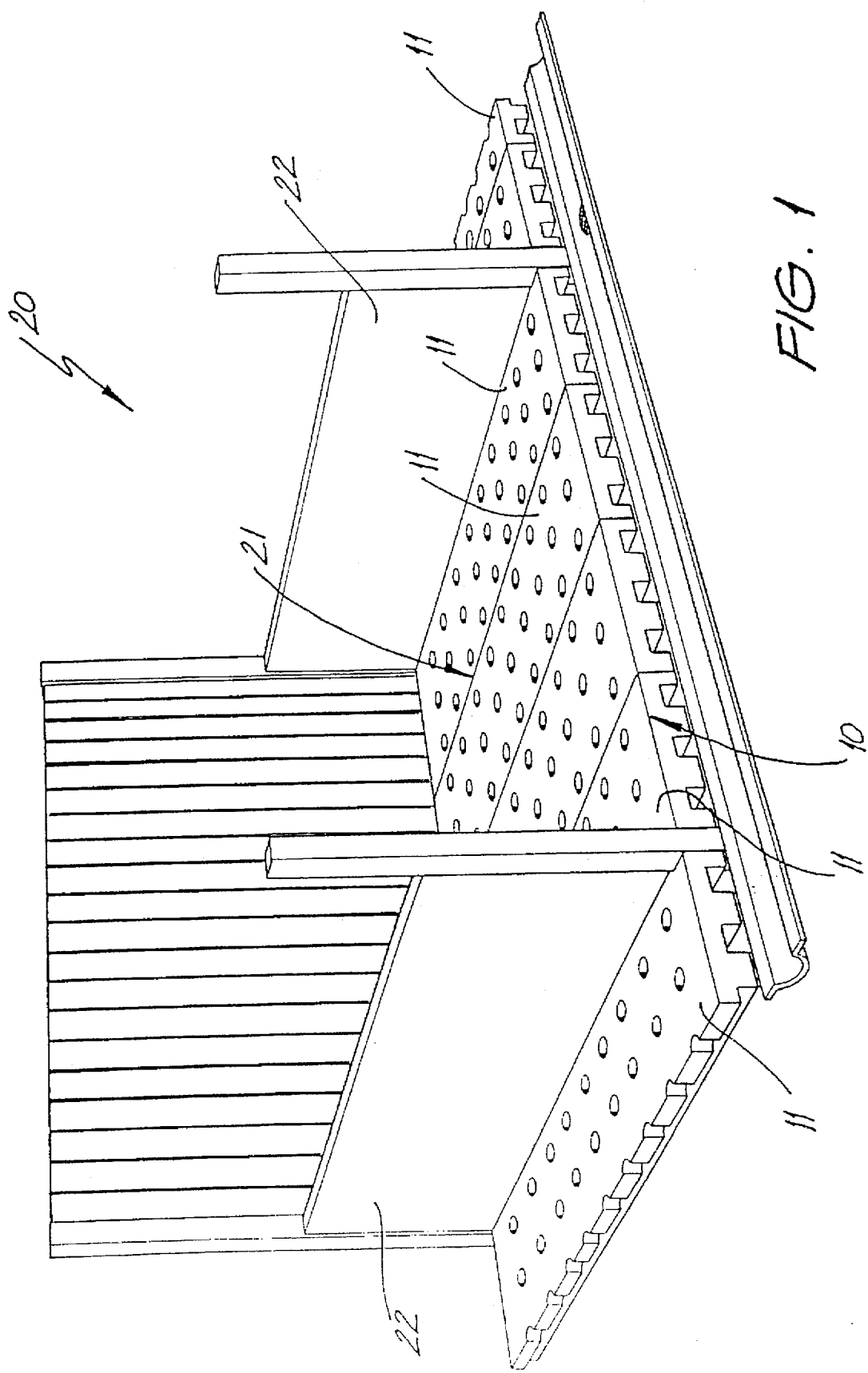
FIG. 1 is a perspective view of a floor/wall matting in accordance with a first embodiment of the present invention.

FIG. 1 shows an animal stable 20 defined by stable floor 21 and stable walls 22. The stable floor 21 is covered by the inventive floor matting 10. As will be explained later, the inventive matting is also suitable for covering stable walls 22.

In the embodiment shown in FIG. 1, the stable floor 21 is covered by a plurality of mats 11. It should be noted that the stable floor 21 or walls 22 may be covered by such a plurality of individual mats 11 or, a single piece of the inventive matting 10 may be cut to precisely cover the stable floor 21 or walls 22.

Figure 2:
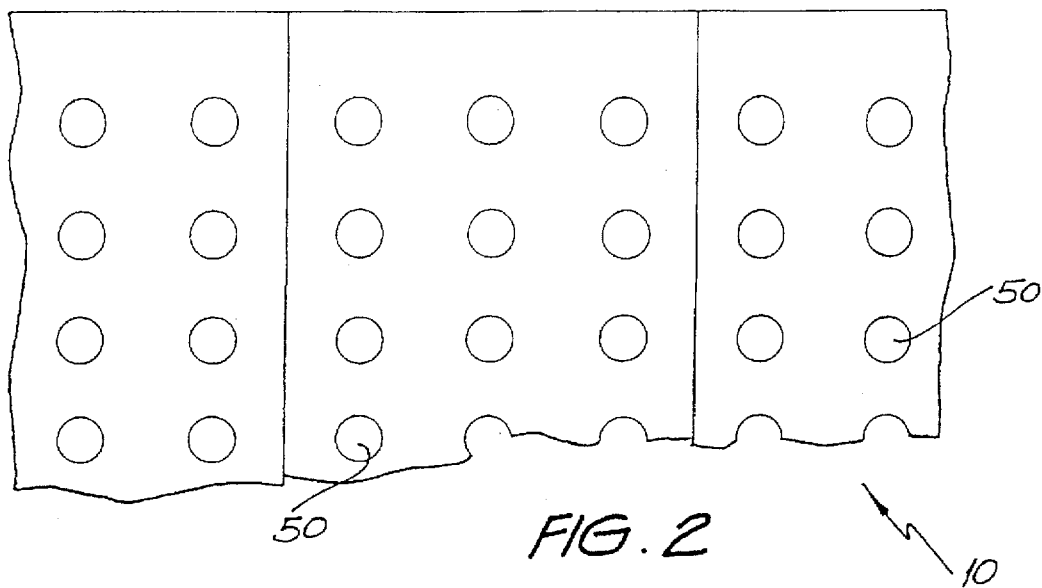
FIG. 2 is a plan view of the floor/wall matting of FIG. 1.
Figure 3:
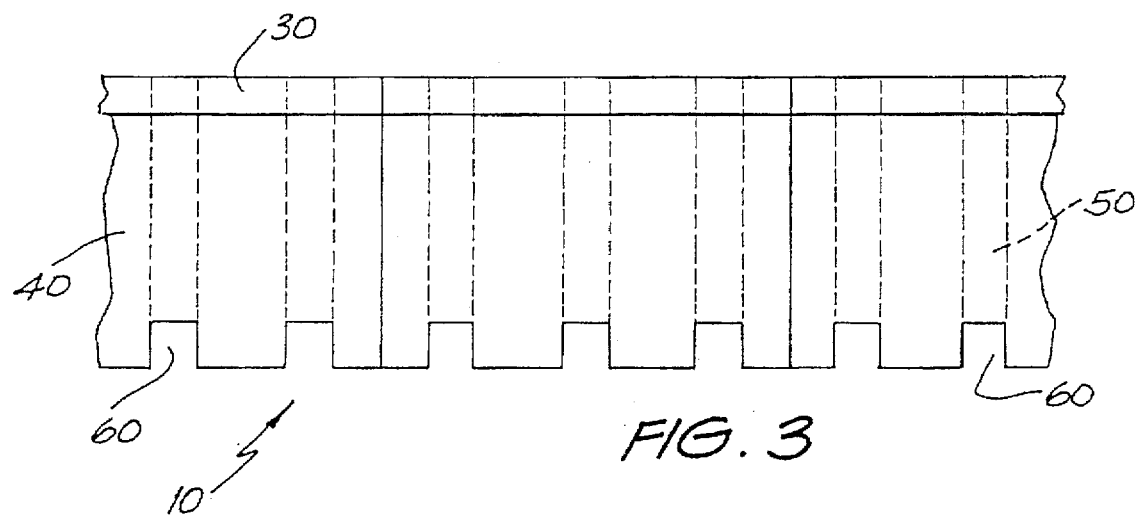
FIG. 3 is an end elevational view of the floor/wall matting of FIGS. 1 and 2.
Figure 4:
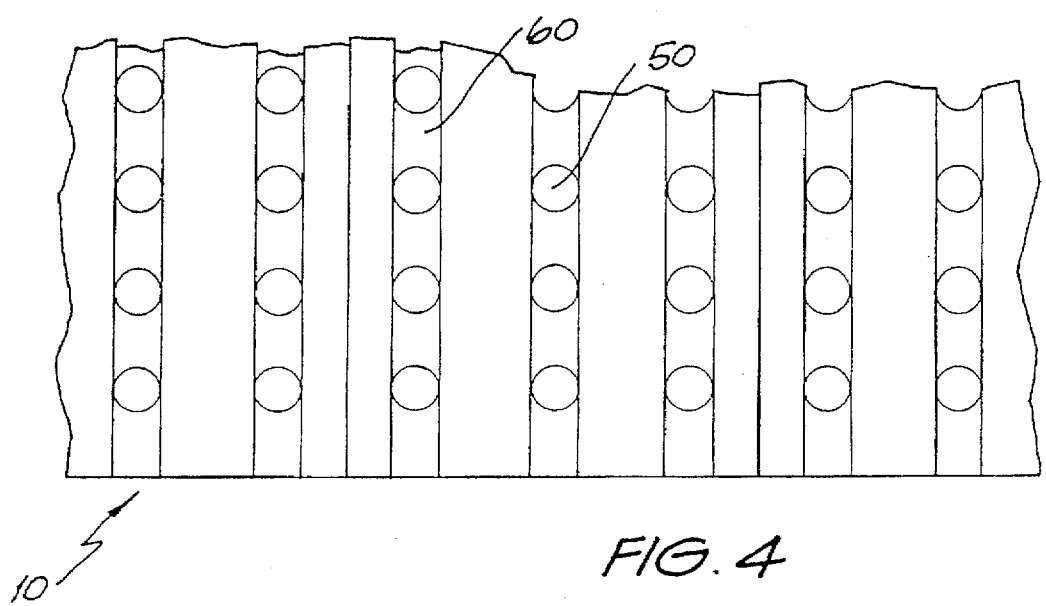
FIG. 4 is a bottom elevational view of the underside of the floor/wall matting of FIGS. 1, 2 and 3.

Turning now to FIGS. 2–4, the inventive floor/wall matting comprises an upper cover layer of moisture impervious puncture resistant material 30 covering a compressible support layer 40. The cover layer 30 used for the present invention is preferably constructed from puncture resistant rubber to avoid damage to the floor/wall matting 10, but also to evenly spread the force applied by an animal's hooves.

Similarly, support layer 40 may be formed from any appropriate non-compressible material. One particular material which has proved most effective is closed cell foam which is virtually impervious to moisture. Using such a closed cell foam ensures that animal waste, debris and water, will not impregnate support layer 40.

One particularly preferred closed cell foam layer is ethylene-vinyl-acetate. Table 1 details performance characteristics of a preserved ethylene-vinyl-acetate foam. Please note however these values may alter by up to ±500% according to the application to which the inventive matting is put.

Other types of material that may be used for support layer 40 include polyisoprene, polychloroprene, polyethylene, E.P.D.M. (ethylene propylene diene monomer), and S.B.R. (styrene butadiene rubber).

A plurality of apertures 50 extend from the upper surface of the matting to a plurality of drainage channels 60 extending along the underside of said matting 10. These apertures are sized to allow passage of animal waste or debris, e.g. stones, dirt, etc. from an upper surface of the matting 10 to drainage channels 60 below.

In this embodiment, drainage channels 60 have been formed integrally on the underside of support layer 40. It is also envisaged, however, that the drainage channels may be formed in the floor or wall covered by the inventive matting 10. As discussed above, the floor 21 or wall 22 may be covered by a single mat cut to size, or may be covered by a plurality of mats 11. As shown in FIGS. 2–4, the mats may be cut to simply abut each other at joint 41 or the longitudinal edges of mats 11 may be formed with a tongue and groove or any other appropriate join to ensure reliable connection.

The inventive matting is installed as follows. Firstly, all particulate bedding in the stable or stall must be removed and the walls and floor hosed down. The matting 10 is then simply laid down on the area to be covered. As mentioned above, the matting may be provided in a single piece and cut to size or provided in standard

TABLE 1

EVA (etylene vinyl acetate) CLOSED CELL FOAM

| Description | | Value | Test Method |
| --- | --- | --- | --- |
| Density | Kg/M$^3$ | 75 | JISK 6767 |
| Tensile Strength | KPa | 700 | JISK 6767 |
| Elongation | % | 150 | JISK 6767 |
| Compressive Hardness | KPa | 80 | JISK 6767 |
| Tear Strength | N/cm | 40 | JISK 6767 |
| Water Absorption | gms/cm$^3$ | 0.001 | JISK 6767 |
| Compression Set | % | 4 | JISK 6767 |

*JISK — Japanese Industrial Standard Testing Method width mats laid down next to each other. On a stable floor 21 as shown in FIG. 1 no connection of the matting to the floor is required. Of course, if the matting is to be connected to walls 22, so the form of connection e.g. hooks, glueing, etc. will be required.

Drainage channels 60 extend along the entire length of floor/wall matting 10, preferably from the uppermost point on stable floor 21, ie, usually at the back, to the lowermost point of stable floor 21, ie, usually at the front. In this way once the inventive matting is in place any animal waste or debris on the matting 11 may be simply removed by hosing it into apertures 50 from where it falls down into drainage channels 60 and flows out towards the sewerage outlet at the front of the stable.

Of course the size, shape and orientation of the floor/wall matting may be altered according to the purpose for which it is used. For example, the applicants have found that a rubber layer of 6 mm, support layer of 60 mm including drainage channels approximately 20 mm high, is particularly suitable for use with horses. Apertures 50 are also 20 mm in diameter to match drainage channels 60. It will be understood, however, that these dimensions may vary quite considerably according to the usage of the matting. In essence, the larger the load to be applied to the inventive matting the thicker or denser the matting should be. As will be understood by those skilled in the art, a matting which is thick or dense enough to thermally and physically insulate a pig may not be sufficient to provide adequate physical and thermal insulation for a horse or cow. It is envisaged by the applicant, therefore, that the various densities and thicknesses of the upper cover layer, compressible support layer and drainage channels will be altered in line with the intended use. For example, the thickness of the rubber layer may vary between 1 and 10 mm, the support layer between 30 and 80 mm thick, and the drainage channels between 10 and 30 mm thick.

Figure 5:
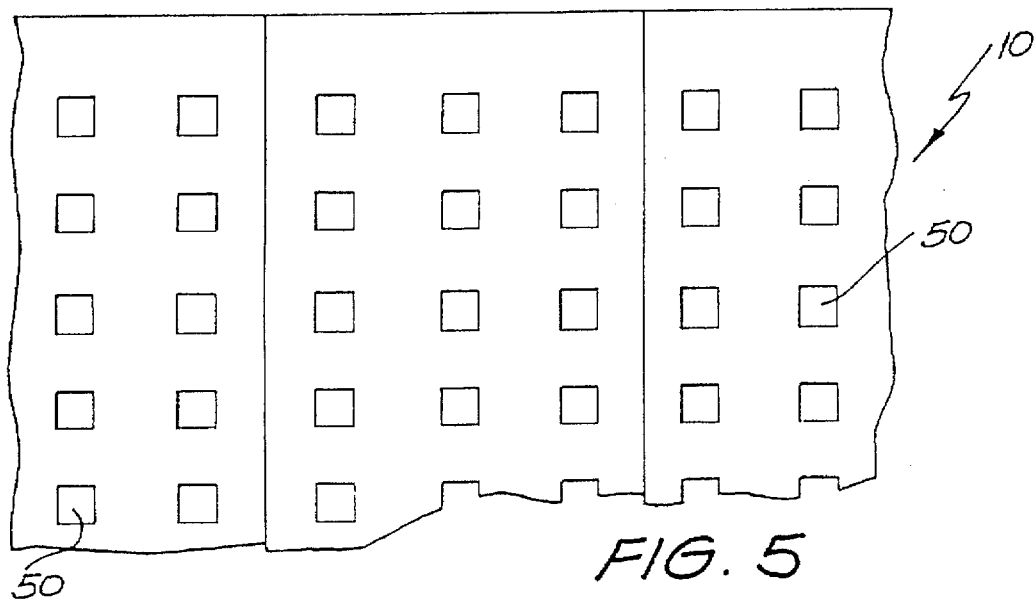
FIGS. 5, 6 and 7 are plan, end elevational and bottom elevational views respectively of a floor/wall matting according to a second embodiment of the present invention.
Figure 6:
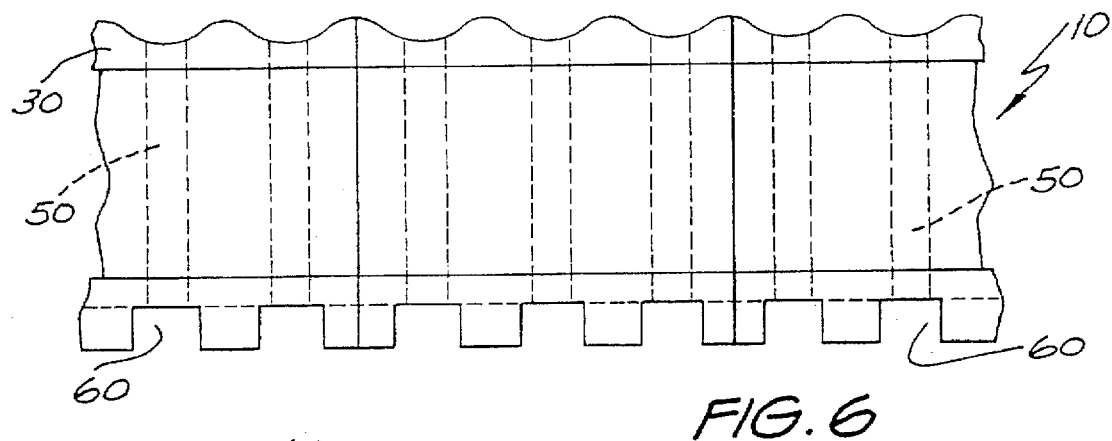
Figure 7:
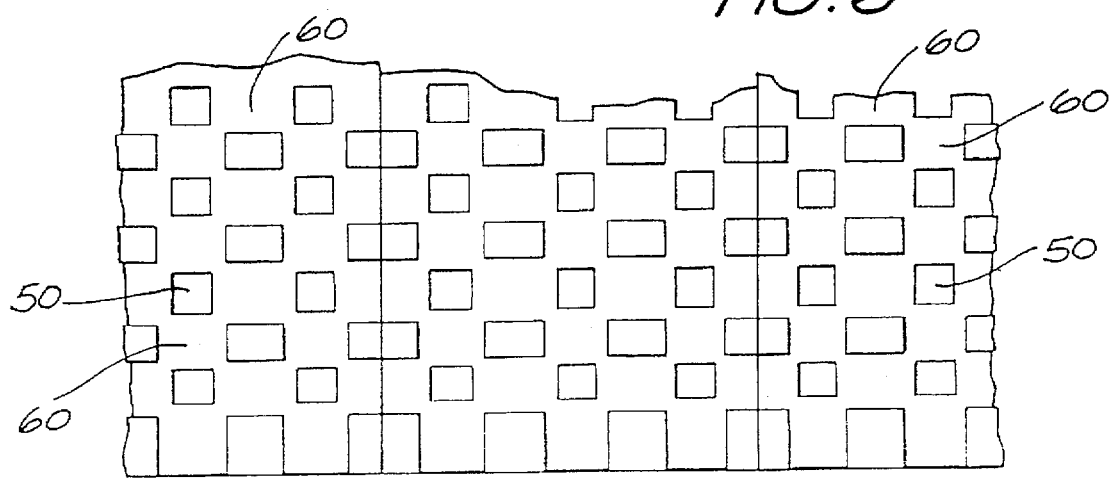

Turning now to FIGS. 5–7, these figures show an alternative embodiment of the present invention in which rubber layer 30 includes a plurality of corrugations. The lower point of these corrugations are aligned with apertures 50 so that material on the upper ridges of the rubber layer will fall towards apertures 50 and downwardly through to drainage channels 60. In this case, the drainage channels are also formed in a separate layer from compressible support layer 40. As shown in this embodiment the drainage channels 60 may be formed from a layer of material that is denser than the support layer 40 such that the height of the drainage channels does not alter when force is applied to the upper surface of the matting 10.

The apertures 50 of FIGS. 5–7 also have a square cross section whereas the apertures in FIGS. 2–4 are circular in cross section. It is envisaged that these apertures 50 and indeed drainage channels 60 may be of any shape or configuration which allow passage of animal waste or debris to easily flow therethrough.

The matting of FIGS. 5–7 also provides a different configuration of drainage channels 60. In this embodiment, the inventive matting 10 is provided with two sets of parallel drainage channels extending at right angles to each other. Apertures 50 are aligned with the intersection points between the two sets of drainage channels.

It is preferred that when installing the floor/wall matting 10, the drainage channels 60 follow the fall of the stable floor or wall. To explain, most stable or stall floors have a slight incline in order to allow water to drain off the stable floor. In most cases this incline extends downwardly towards the front of the stable. Accordingly, it is preferable that the matting 10 is positioned such that drainage channels 60 follow the incline of the stable floor and shown in FIG. 1.

When connecting the floor/wall matting to the wall of a stable, stall or float, etc, drainage channels 60 should extend vertically.

The embodiment of FIGS. 5–7 is useful where there is only a very slight incline in the stable floor or, alternatively, the stable floor tilts both to the front and to one side. Since there are drainage channels extending both longitudinally and laterally of the inventive matting 10, the animal waste or debris in the drainage channels may flow both laterally, longitudinally and diagonally along the underside of the inventive matting.

Figure 8:
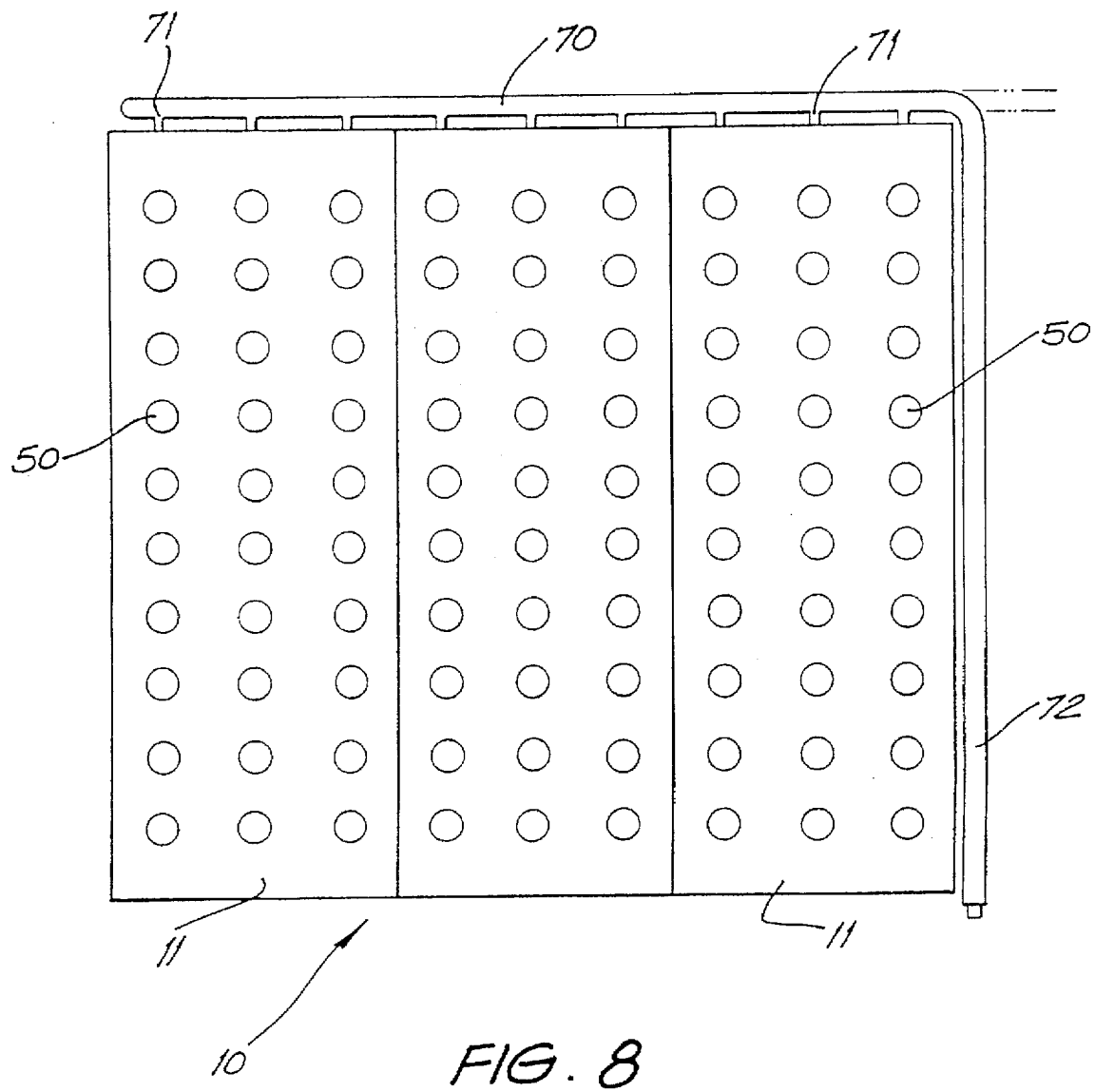
FIG. 8 is a plan view of a floor/wall covering and cleaning assembly according to a third embodiment of the present invention.
Figure 9:
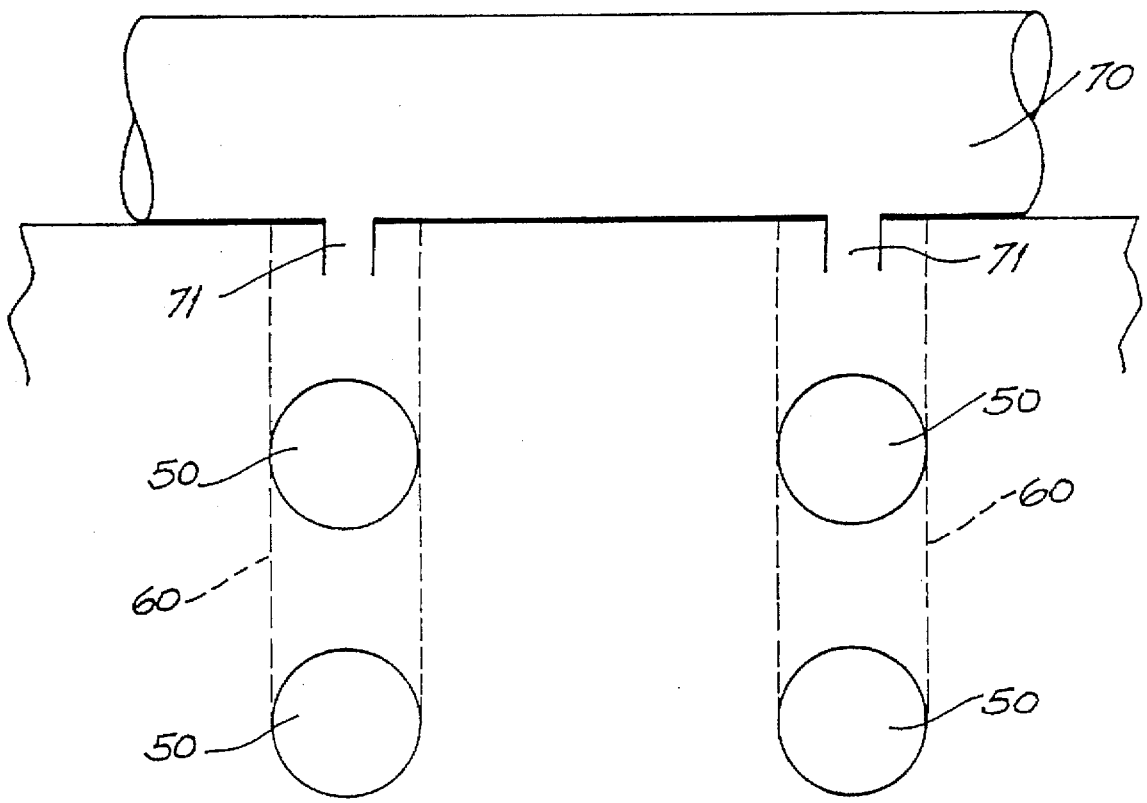
FIG. 9 is a plan view of a flushing system used in conjunction with the floor/wall matting of FIGS. 1–7.
Figure 10:
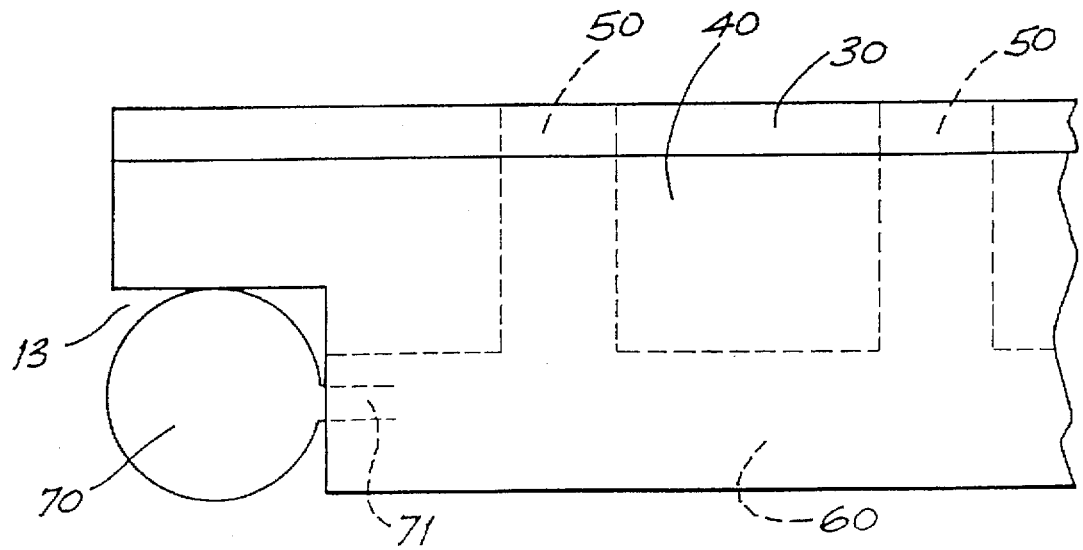
FIG. 10 is an end elevational view of the flushing system of FIG. 9.

Another aspect of the present invention is the floor/wall covering and cleaning assembly shown in FIGS. 8–10. This covering and cleaning assembly ensures that all waste or debris falling through apertures 50 is flushed out through drainage channels 60 into a sewerage outlet.

Turning firstly to FIG. 8, this floor/wall covering and cleaning assembly comprises the abovementioned inventive matting 10 combined with a flushing system positioned adjacent at an edge 12 of matting 10. This flushing system is used to flush out of the drainage channels any material which has passed through the apertures of the floor/wall matting 10.

To explain, the flushing system comprises a fluid conduit 70 positioned along the end edge 12 of the inventive matting 10.

As shown in FIGS. 9 and 10, the conduit 70 has a plurality of outlets 71 aligned with drainage channels 60 in order to force a flushing liquid along these channels, thereby taking with it all animal waste, debris, dirt, etc, towards the septic or sewerage outlet.

As shown in FIG. 10, it is preferable that the underside of the matting 10 provided with a recess 13 in order to position flushing conduit 70. In this way, the floor/wall matting 10 does not leave the conduit 70 exposed. The animal is protected from conduit 70 and conversely the conduit 70 is protected from damage. It is preferred that the recess 13 is formed at both ends of the inventive matting. In this way, the matting may be reversed to evenly spread wear. In addition, having recesses 13 at both ends provides a further lateral drainage channel to allow fluids flowing to the front of the stable to flow to exit points of the stable. While in most cases a simple water flushing may be used to remove all debris in drainage channels 60, it may sometimes be necessary to include a disinfectant or bacteriocide to prevent disease.

The flushing system may be used continuously or intermittently. Conduit 70 and outlet 71 may be appropriately sized to match the particular drainage channels and may be fed from mains pressure or from a pump or tank. The flushing system may be reticulated and the drainage channels flushed either individually or in groups.

In FIG. 8, the flushing pipe 70 includes connection pipe 72 extending to a front portion of the stable floor. The end portion of connection pipe 72 may include a hose connection for intermittent flushing of the stable floor. Alternatively, the flushing conduit 70 may have an upwardly extending elbow pipe at the rear end of the stable for connection to a hose or mains pressure for flushing of the stable floor. When used in conjunction with the inventive matting of FIGS. 5–7, connection pipe 72 may also include outlet 71 so that flushing liquid is forced along both laterally extending and longitudinally extending drainage channels FIG. 11 depicts an alterative embodiment of the present invention wherein instead of providing drainage channels in the bottom of matting 11, such channels are formed by corresponding grooves 80 provided in the stable floor (or a mat underlayment forming a floor surface) 82. In this case the result is the same as above; animal waste or debris passing through the openings in the matting 10 pass into the grooves 80 and drain or are flushed to the gutter or other conduit 84 for removal.

Industrial Applicability

The present inventive matting and covering and cleaning assembly may be used anywhere where it is desired to physically and thermally insulate a floor or wall.

It is particularly suitable for physically and thermally insulating animals from their surroundings either in permanent locations such as stables, stalls, etc. or when animals are transported, e.g. ramps, fences, floats, etc.

It may also be used in children's playgrounds etc. where the physical and thermal protection along with the hygienic conditions provided by the inventive matting and covering and cleaning assembly are most desirable.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A floor/wall matting comprising a compressible support layer with an upper cover layer of moisture impervious puncture resistant material, said matting having a plurality of apertures therethrough sized to at least allow passage of animal fluid waste from the upper cover layer of said matting to a plurality of drainage channels extending along an underside of said matting, said drainage channels being formed on the underside of the support layer.

2. A floor/wall matting as claimed in claim 1 wherein said support layer is constructed from a substantially moisture impermeable closed cell foam.

3. A floor/wall matting as claimed in claim 2 wherein said support layer is between 30 and 80 mm thick.

4. A floor/wall matting as claimed in claim 3 wherein said cover layer is constructed from a puncture resistant rubber layer between 1 and 10 mm thick.

5. A floor/wall matting as claimed in claim 4 wherein said drainage channels are formed as a plurality of parallel channels adapted to extend in a direction of fall of the floor or wall.

6. A floor/wall matting as claimed in claim 2 wherein said closed cell foam is selected from the group consisting of ethylene-vinyl-acetate, ethylene-propylene-diene-monomer (E.P.D.M.), styrene-butadiene-rubber (S.B.R.), polyisoprene, polychloroprene, or polyethylene.

7. A floor/wall covering and cleaning assembly comprising a floor/wall matting as claimed in claim 6 and a flushing system adjacent the drainage channels of said floor/wall matting, said flushing system being adapted to use a flushing fluid to flush waste and debris, which has passed through the apertures of said floor/wall matting, out of said drainage channels.

8. A floor/wall covering and cleaning assembly as claimed in claim 7 wherein said flushing fluid is water.

9. A floor/wall matting as claimed in claim 1 wherein said support layer is constructed from a substantially moisture impermeable closed cell foam.

10. A floor/wall matting as claimed in any one of claim 1, wherein said support layer is between 30 and 80 mm thick.

11. A floor/wall covering and cleaning assembly comprising:
    a matting including a compressible support layer with an upper cover layer of moisture impervious puncture resistant material, said matting having a plurality of apertures therethrough sized to at least allow passage of animal fluid waste from the upper cover layer of said matting to a plurality of drainage channels extending along an underside of said matting, said drainage channels formed on the underside of the support layer; and
    a flushing system adjacent the drainage channels of said floor/wall matting, said flushing system being adapted to flush waste and debris, which has passed through the apertures of said matting, out of said drainage channels;
    wherein said flushing system comprises a conduit extending along an end edge of said matting with a plurality of apertures in said conduit aligned with said drainage channels to force a flushing fluid along said channels.

12. A floor/wall covering and cleaning assembly as claimed in claim 11 wherein said flushing fluid is water.

13. A floor/wall covering and cleaning assembly as claimed in claim 12 wherein said flushing fluid includes a disinfectant or bacteriocide.

14. A floor/wall covering and cleaning assembly as claimed in claim 13 wherein said conduit extends along an upper portion of a floor/wall to force fluid along said drainage channels to lower portions below said upper portions.

15. A floor/wall matting as claimed in any one of claim 1 or 2, wherein said cover layer is constructed from a puncture resistant rubber layer between 1 and 10 mm thick.

16. A floor/wall matting as claimed in any one of claims 1 or 3, wherein said drainage channels are formed as a plurality of parallel channels adapted to extend in a direction of fall of the floor or wall.

17. A floor/wall covering and cleaning assembly comprising a floor/wall matting as claimed in any one of claims 1, 2, 3, 4, or 5, and a flushing system adjacent the drainage channels of said floor/wall matting, said flushing system being adapted to use a flushing fluid to flush waste and debris, which has passed through the apertures of said floor/wall matting, out of said drainage channels.

18. A floor/wall covering and cleaning assembly as claimed in claims 7 or 11, wherein said flushing fluid includes a disinfectant or bacteriocide.

19. A floor/wall covering and cleaning assembly as claimed in any one of claims 7, 11 or 12, wherein said conduit extends along an upper portion of a floor/wall to force fluid along said drainage channels to lower portions below said upper portions.

20. A floor/wall covering and cleaning assembly as claimed in claim 13 wherein said conduit extends along an upper portion of a wall to force fluid along said drainage channels to lower portions below said upper portions.

21. A floor/wall matting comprising a compressible support layer with an upper cover layer of moisture impervious puncture resistant material, said matting having a plurality of apertures therethrough sized to at least allow passage of animal fluid waste from the upper cover layer of said matting to a plurality of drainage channels extending along an underside of said matting said drainage channels being formed in the wall or floor covered by the matting when in situ.

22. A floor/wall covering and cleaning assembly comprising a compressible support layer with an upper cover layer of moisture impervious puncture resistant material, said matting having a plurality of apertures therethrough sized to at least allow passage of animal fluid waste from the upper cover layer of said matting to a plurality of drainage channels extending along an underside of said matting, said drainage channels being formed in the wall or floor covered by the matting when in situ; and a flushing system adjacent the drainage channels of said floor/wall matting, said flushing system being adapted to flush waste and debris, which has passed through the apertures of said floor/wall matting, out of said drainage channels;

wherein said flushing system comprises a conduit extending along an end edge of said floor/wall matting with a plurality of apertures in said conduit aligned with said drainage channels to force a flushing fluid along said channels.

* * * * *